United States Patent
Cartmell et al.

(10) Patent No.: US 7,302,526 B1
(45) Date of Patent: Nov. 27, 2007

(54) HANDLING MEMORY FAULTS FOR MIRRORED MEMORY

(75) Inventors: Jerome J. Cartmell, Natick, MA (US); Qun Fan, Boston, MA (US); Steven T. McClure, Northboro, MA (US); Robert DeCrescenzo, Franklin, MA (US); Haim Kopylovitz, Newton, MA (US); Eli Shagam, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 355 days.

(21) Appl. No.: 10/811,566

(22) Filed: Mar. 29, 2004

(51) Int. Cl.
*G06F 12/16* (2006.01)

(52) U.S. Cl. .......................... 711/120; 711/162; 714/6; 714/7

(58) Field of Classification Search ...................... None
See application file for complete search history.

(56) References Cited

U.S. PATENT DOCUMENTS

| | | | |
|---|---|---|---|
| 5,206,939 A | 4/1993 | Yanai et al. | |
| 5,544,347 A | 8/1996 | Yanai et al. | |
| 5,586,291 A * | 12/1996 | Lasker et al. | 711/113 |
| 5,664,144 A | 9/1997 | Yanai et al. | |
| 5,742,792 A | 4/1998 | Yanai et al. | |
| 5,761,705 A * | 6/1998 | DeKoning et al. | 711/113 |
| 5,778,394 A | 7/1998 | Galtzer et al. | |
| 5,845,147 A | 12/1998 | Vishlitzky et al. | |
| 5,857,208 A | 1/1999 | Ofek | |
| 5,909,692 A | 6/1999 | Yanai et al. | |
| 6,173,377 B1 | 1/2001 | Yanai et al. | |
| 6,185,653 B1 | 2/2001 | Yanai et al. | |
| 6,418,509 B1 | 7/2002 | Yanai et al. | |
| 6,502,205 B1 | 12/2002 | Yanai et al. | |
| 6,571,324 B1 * | 5/2003 | Elkington et al. | 711/162 |
| 6,587,919 B2 | 7/2003 | Yanai et al. | |
| 6,625,705 B2 | 9/2003 | Yanai et al. | |
| 6,647,474 B2 | 11/2003 | Yanai et al. | |
| 6,965,979 B2 * | 11/2005 | Burton | 711/202 |
| 7,055,059 B2 | 5/2006 | Yanai et al. | |
| 7,073,090 B2 | 7/2006 | Yanai et al. | |
| 2004/0148486 A1 * | 7/2004 | Burton | 711/202 |
| 2004/0205384 A1 * | 10/2004 | Lai et al. | 714/6 |

* cited by examiner

*Primary Examiner*—Kevin Verbrugge
(74) *Attorney, Agent, or Firm*—Muirhead and Saturnelli, LLC

(57) ABSTRACT

Handling a faulting memory of a pair of mirrored memories includes initially causing a non-faulting memory of the pair of mirrored memories to service all read and write operations for the pair of mirrored memories, determining that hardware corresponding to the faulting memory of the pair of mirrored memories has been successfully replaced to provide a new memory, in response to the new memory being provided, causing data to be copied from the non-faulting memory to the new memory while data is being read to and written from the non-faulting memory, and, in response to successful copying to the new memory, causing writes to be performed to both memories of the pair of mirrored memories and selecting one of the pair of mirrored memories for read operations when one or more read operations are performed. Handling a faulting memory may also include, in response to a write being performed to the non-faulting memory while data is being copied from the non-faulting memory to the new memory, causing the write to be performed to the non-faulting memory and the new memory.

17 Claims, 10 Drawing Sheets

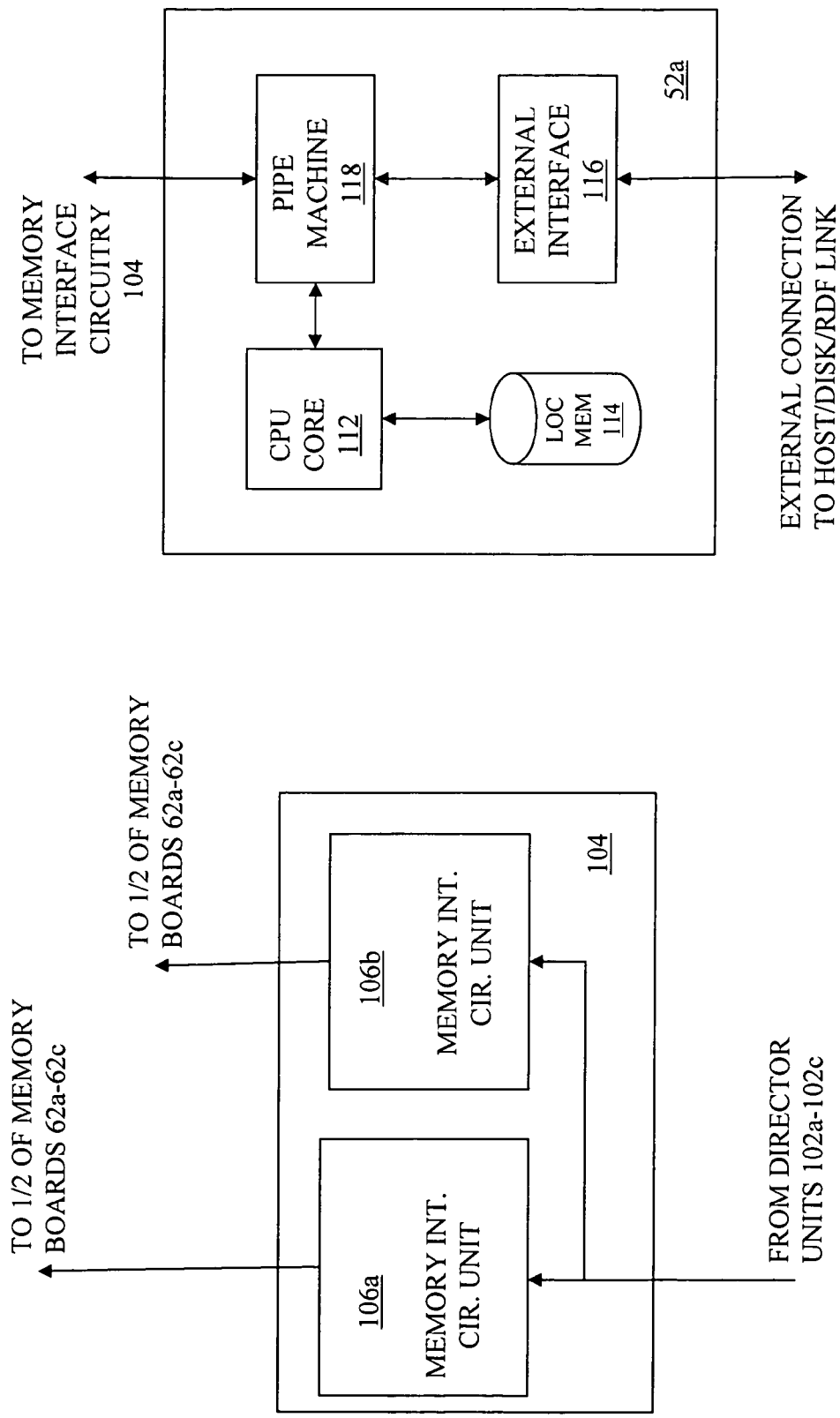

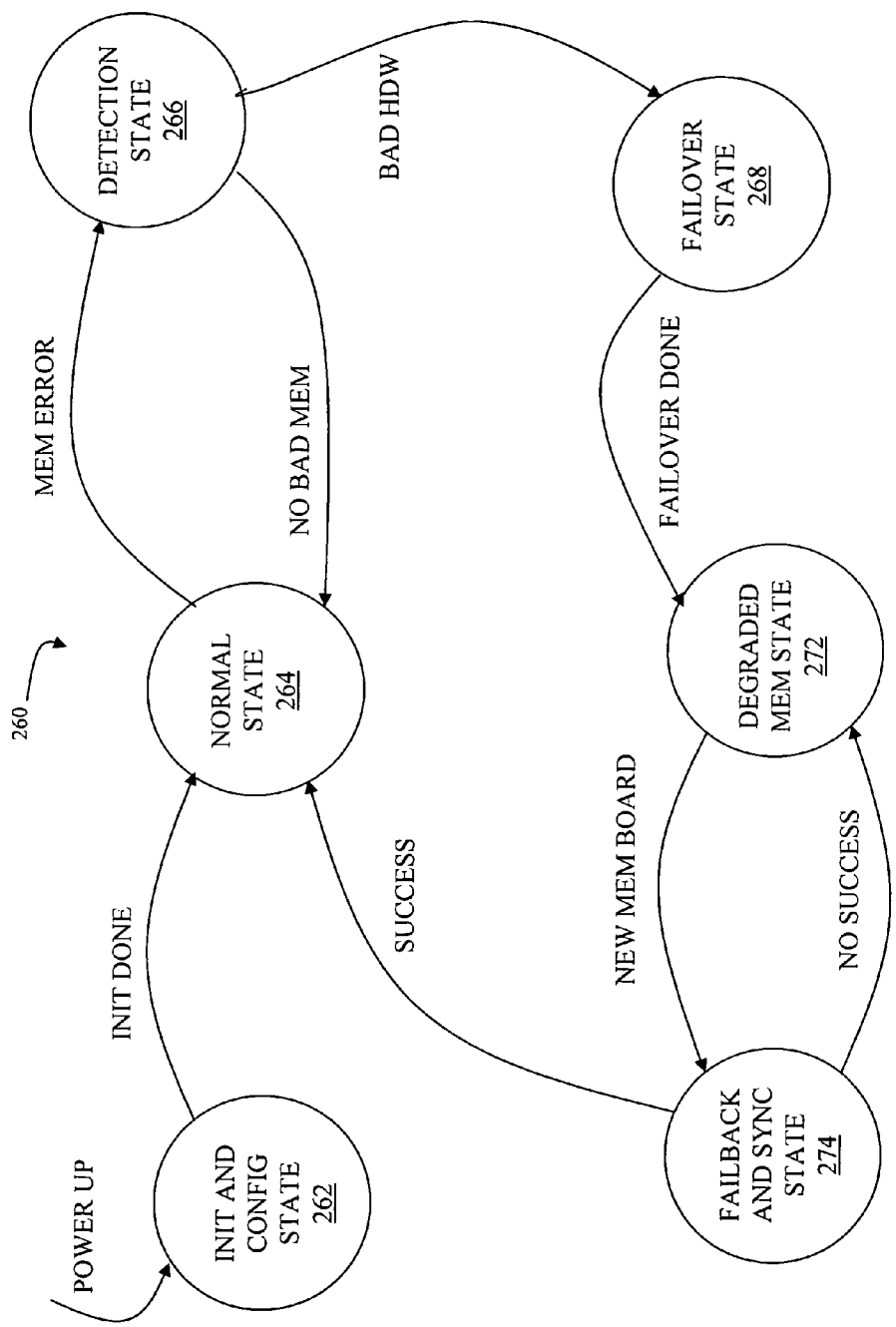

HANDLING MEMORY FAULTS FOR MIRRORED MEMORY

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al. U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

The storage device may contain volatile memory used internally to provide, for example, cache functionality, global sharing of data, task queuing, etc. Although the volatile memory may not be used for permanent storage of data in the storage device, there may be times during the operation of the storage device when the volatile memory contains the most recent, and sometimes the only, copy of certain data. For example, if the volatile memory is used for caching, then it is possible that data written by a host processor to the storage device is initially contained only in the volatile memory prior to being destaged to one or more of the disk drives. Accordingly, it is desirable to guard against the possibility of memory hardware failures.

One way to guard against memory hardware failures is to provide mirrored memory, where data is duplicated in two separate memory locations, preferably corresponding to different memory hardware. Each of the memory locations is a mirror of the other. However, a difficulty introduced by mirrored memory is that it increases the complexity of the software that reads and writes data from and to the mirrored memory. In addition, when a one of the mirrors corresponding to the mirrored memory fails, it becomes even more complex for software that accesses the memory to adapt to the failure and/or adapt to any repairs made to the memory.

It is desirable to address some of the difficulties associated with using mirrored memory.

SUMMARY OF THE INVENTION

According to the present invention, accessing data memory includes writing data to a first memory location and to a second memory location in response to a request to write data to a memory address that corresponds to both locations, where the first and second memory locations are mirrored, in response to a request to read data from the memory address, reading data from the first memory location or the second memory location based on load balancing, and accessing data from the second memory location in response to a request to access data at the memory address when memory hardware corresponding to the first memory location has failed. Accessing the data memory may include requesting access to a specific one of the first and second memory locations. The memory address may contain a portion that is common to both the first memory location and the second memory location. Hardware coupled to the memory may cause data written using the memory address to be automatically written to the first memory location and the second memory location. Software may cause data written using the memory address to be written to the first memory location and the second memory location using a first set of commands that writes the data to the first memory location and a second set of commands that writes to the second memory location. Load balancing may include toggling at least one variable between a first state and a second state and where data is read from the first location when the at least one variable is in the first state and from the second location when the at least one variable is in the second state. Accessing data memory may also include coupling a director board to the memory and coupling one of: a host, a disk, and a communications link to the director board. Accessing data memory may also include transferring data between the memory and the director board. Accessing data memory may also include the director board causing data to be transferred between the memory and one of: the host, the disk, and the communication link.

According further to the present invention, computer software that accesses data memory includes executable code that writes data to a first memory location and to a second memory location in response to a request to write data to a memory address that corresponds to both locations, where the first and second memory locations are mirrored, executable code that reads data from the first memory location or the second memory location based on load balancing in response to a request to read data from the memory address, and executable code that accesses data from the second memory location in response to a request to access data at the memory address when memory hardware corresponding to the first memory location has failed. The computer software may also include executable code that services requests to access to a specific one of the first and second memory locations. The memory address may contain a portion that is common to both the first memory location and the second memory location. The computer software may further include executable code that causes data written using the memory address to be written to the first memory location and the second memory location using a first set of commands that writes the data to the first memory location and a second set of commands that writes to the second memory location. The computer software may further include executable code that toggles at least one variable between a first state and a second state where data is read from the first location when the at least one variable is in the first state and from the second location when the at least one variable is in the second state.

According further to the present invention, a data storage device includes a plurality of disk drives, an internal volatile memory, and a plurality of directors coupled to the memory, where some of the directors are coupled to the disk drives and some of the directors allow external access to the data storage device and where each of the directors access the memory by writing data to a first memory location and to a second memory location in response to a request to write data to a memory address that corresponds to both locations, where the first and second memory locations are mirrored, in response to a request to read data from the memory address, the directors read data from the first memory location or the second memory location based on load balancing, and the directors access data from the second memory location in response to a request to access data at the memory address when memory hardware corresponding to the first memory location has failed. The directors may request access to a specific one of the first and second memory locations. The memory address may contain a portion that is common to both the first memory location and the second memory location. Hardware coupled to the memory may cause data written using the memory address to be automatically written to the first memory location and the second memory location. Software may cause data written using the memory address to be written to the first memory location and the second memory location using a first set of commands that writes the data to the first memory location and a second set of commands that writes to the second memory location. Load balancing may include toggling at least one variable between a first state and a second state and where data is read from the first location when the at least one variable is in the first state and from the second location when the at least one variable is in the second state.

According further to the present invention, handling a faulting memory of a pair of mirrored memories includes initially causing a non-faulting memory of the pair of mirrored memories to service all read and write operations for the pair of mirrored memories, determining that hardware corresponding to the faulting memory of the pair of mirrored memories has been successfully replaced to provide a new memory, in response to the new memory being provided, causing data to be copied from the non-faulting memory to the new memory while data is being read to and written from the non-faulting memory, and, in response to successful copying to the new memory, causing writes to be performed to both memories of the pair of mirrored memories and selecting one of the pair of mirrored memories for read operations when one or more read operations are performed. Handling a faulting memory may also include, in response to a write being performed to the non-faulting memory while data is being copied from the non-faulting memory to the new memory, causing the write to be performed to the non-faulting memory and the new memory. Handling a faulting memory may also include, in response to a write being performed to the non-faulting memory while data is being copied from the non-faulting memory to the new memory, causing a corresponding portion of the non-faulting memory and the new memory to be locked to prevent additional access thereto. Determining that hardware corresponding to the faulting memory of the pair of mirrored memories has been successfully replaced may include testing the memory hardware prior to causing data to be copied from the non-faulting memory to the new memory. Handling a faulting memory may also include, in response to testing the memory hardware indicating a failure, determining that the hardware has not been successfully replaced. Testing the memory hardware may include having each of a plurality of processors perform tests on a section of the memory hardware. Each of the plurality of processors may determine which section of data to test based on information provided to all the processors in a global memory. Causing data to be copied may include having each of a plurality of processors copy a section of the data. Each of the plurality of processors may determine which section of data to copy based on information provided to all the processors in a global memory.

According further to the present invention, computer software that handles a faulting memory of a pair of mirrored memories, includes executable code that initially causes a non-faulting memory of the pair of mirrored memories to service all read and write operations for the pair of mirrored memories, executable code that determines that hardware corresponding to the faulting memory of the pair of mirrored memories has been successfully replaced to provide a new memory, executable code that causes data to be copied from the non-faulting memory to the new memory while data is being read to and written from the non-faulting memory after the new memory being provided, and executable code that causes writes to be performed to both memories of the pair of mirrored memories and selects one of the pair of mirrored memories for read operations when one or more read operations are performed in response to successful copying to the new memory. The computer software may also include executable code that causes the write to be performed to the non-faulting memory and the new memory in response to a write being performed to the non-faulting memory while data is being copied from the non-faulting memory to the new memory. The computer software may also include executable code that causes a corresponding portion of the non-faulting memory and the new memory to be locked to prevent additional access thereto in response to a write being performed to the non-faulting memory while data is being copied from the non-faulting memory to the new memory. Executable code that determines that hardware corresponding to the faulting memory of the pair of mirrored memories has been successfully replaced may include executable code that tests the memory hardware prior to causing data to be copied from the non-faulting memory to the new memory. The computer software may also include executable code that determines that the hardware has not been successfully replaced in response to testing the memory hardware indicating a failure.

According further to the present invention, a data storage device includes a plurality of disk drives, an internal volatile memory, and a plurality of directors coupled to the memory, where some of the directors are coupled to the disk drives and some of the directors allow external access to the data storage device and where each of the directors handles a faulting memory of a pair of mirrored memories by initially causing a non-faulting memory of the pair of mirrored memories to service all read and write operations for the pair of mirrored memories, determining that hardware corresponding to the faulting memory of the pair of mirrored memories has been successfully replaced to provide a new memory, in response to the new memory being provided, causing data to be copied from the non-faulting memory to the new memory while data is being read to and written from the non-faulting memory, and, in response to successful copying to the new memory, causing writes to be performed to both memories of the pair of mirrored memories and selecting one of the pair of mirrored memories for read operations when one or more read operations are performed. Each of the directors, in response to a write being performed to the non-faulting memory while data is being copied from the non-faulting memory to the new memory, may cause the write to be performed to the non-faulting memory and the new memory. Each of the directors, in response to a write being performed to the non-faulting memory while data is being copied from the non-faulting memory to the new memory, may cause a corresponding portion of the non-faulting memory and the new memory to be locked to prevent additional access thereto. Determining that hardware corresponding to the faulting memory of the pair of mirrored memories has been successfully replaced may include testing the memory hardware prior to causing data to be copied from the non-faulting memory to the new memory. In response to testing the memory hardware indicating a failure, at least one of the directors may determine that the hardware has not been successfully replaced. Testing the memory hardware may include having at least some of the directors perform tests on a section of the memory hardware.

BRIEF DESCRIPTION OF DRAWINGS

FIG. 6 is a schematic diagram showing memory interface circuitry in more detail according to the system described herein.

FIG. 7 is a schematic diagram showing a director unit in more detail according to the system described herein.

FIG. 12 is a state diagram illustrating memory states and replacement of memory according to the system described herein.

DETAILED DESCRIPTION OF VARIOUS EMBODIMENTS

Figure 1:
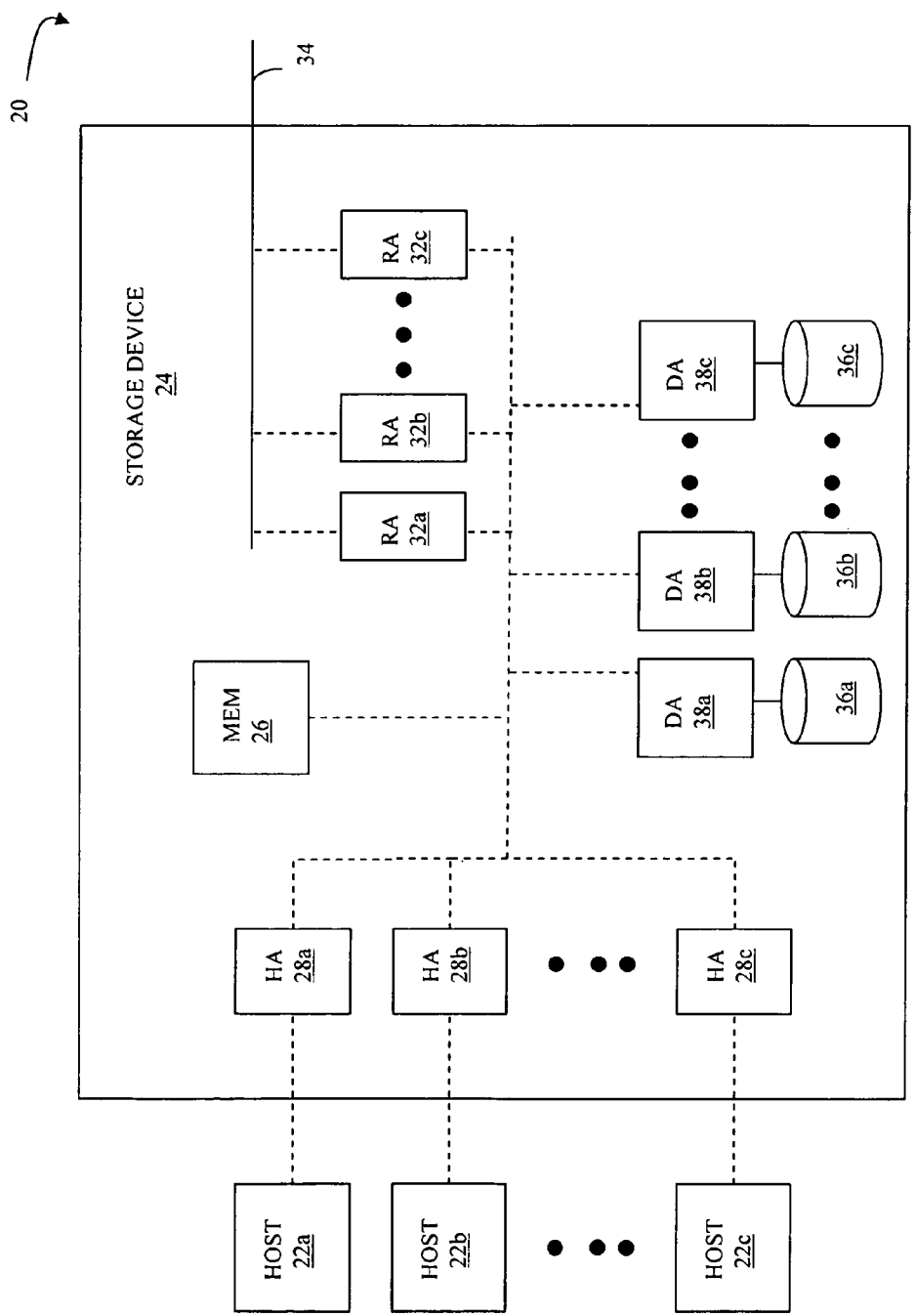
FIG. 1 is a schematic diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric.

Figure 2:
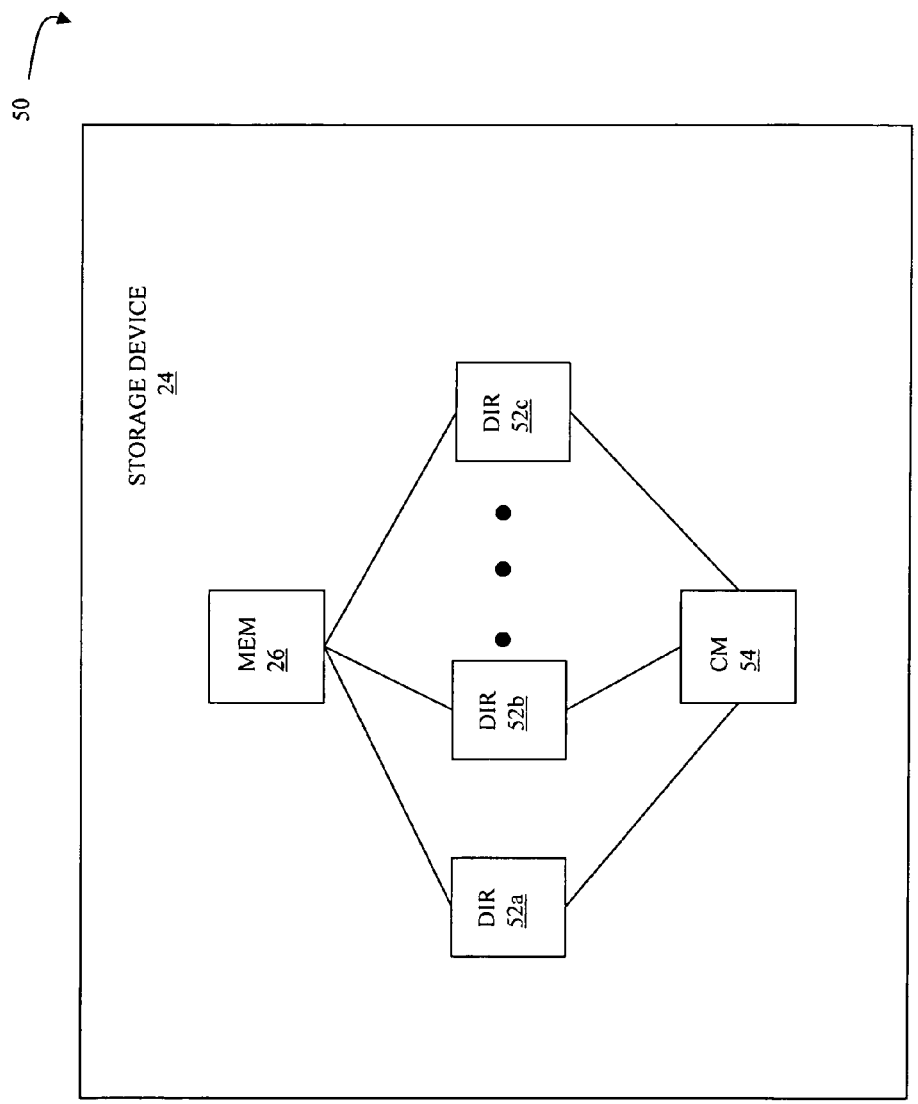
FIG. 2 is a schematic diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixteen directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. In addition, a sending one of the directors 52a-52c may be able to broadcast a message to all of the other directors 52a-52c at the same time.

Figure 3:
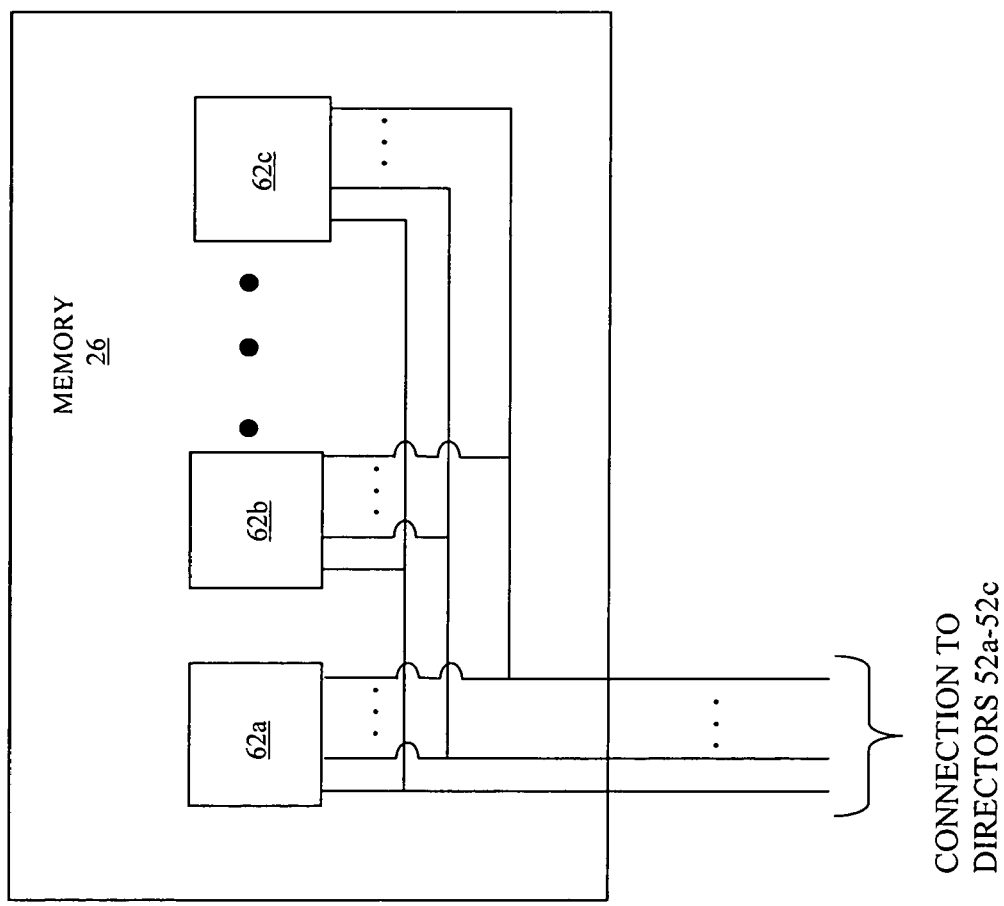
FIG. 3 is a schematic diagram showing memory in more detail according to the system described herein.

Referring to FIG. 3, the memory 26 is shown in more detail as having a plurality of memory board 62a-62c. Each of the memory boards 62a-62c has a separate connection to one of the directors 52a-52c. Each of the memory boards 62a-62c is separately and independently addressable by any one of the directors 52a-52c. In an embodiment herein, there are a maximum of eight memory boards for the memory 26. However, it will be appreciated by one of ordinary skill in the art that in other embodiments, a different number of memory boards may be used and/or the memory 26 may have a different maximum number of memory boards that may be used.

Figure 4:
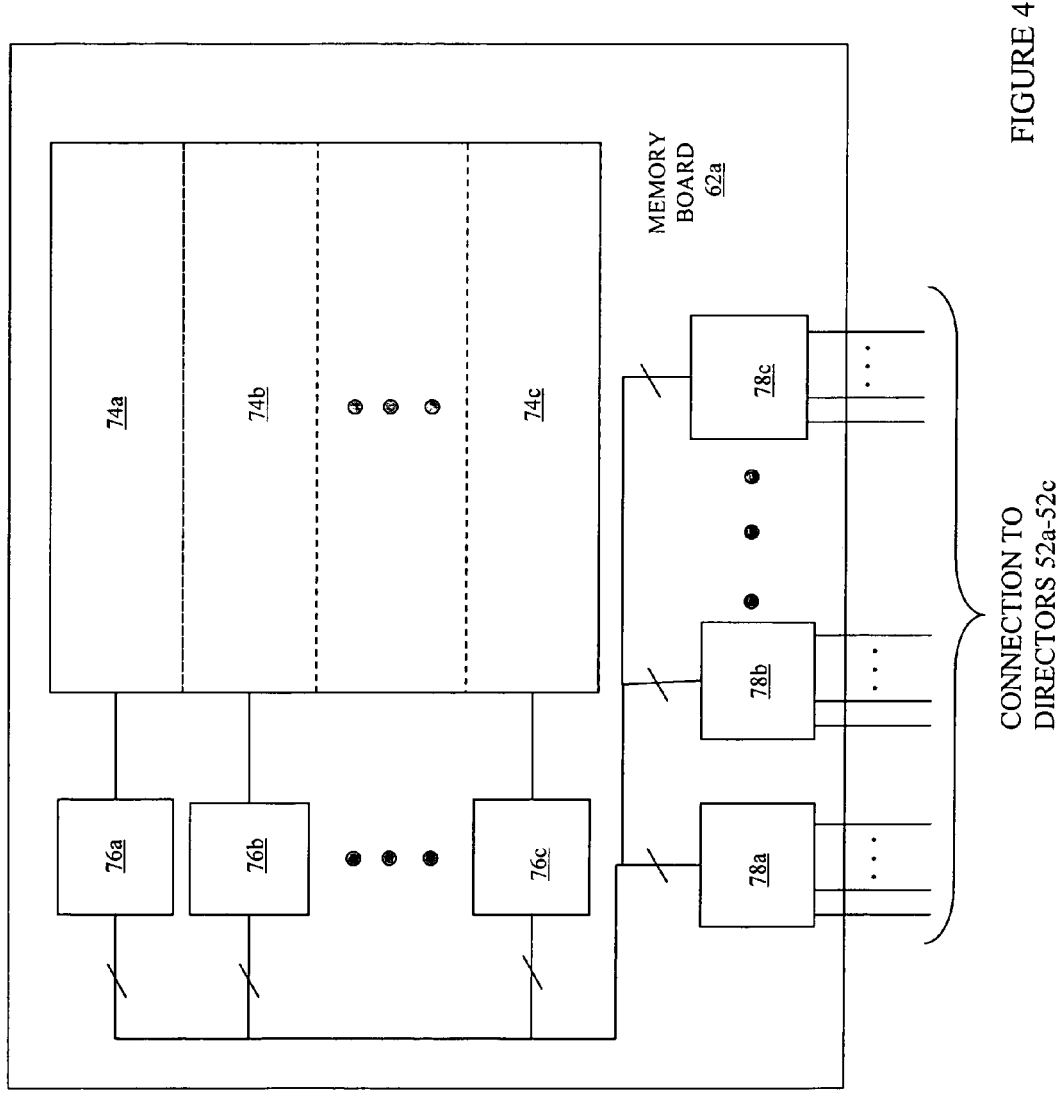
FIG. 4 is a schematic diagram showing a memory board in more detail according to the system described herein.

Referring to FIG. 4, a memory board 62a is shown in more detail as including a semiconductor memory subdivided into subsections 74a-74c. Each of the subsections 74a-74c is separately addressable by memory access circuits 76a-76c coupled to the subsections 74a-74c. In an embodiment herein, each of the memory access circuits 76a-76c is coupled to a respective one of the subsections 74a-74c.

The memory board 62a also includes director interface circuits 78a-78c for connecting with the directors 52a-52c. In an embodiment herein, each of the director interface circuits 78a-78c connects to a subset of the directors 52a-52c so that, for example, if there are sixteen directors and four director interface circuits for coupling to the directors, then each of the director interface circuits would be coupled to four of the directors.

In an embodiment herein, each of the director interface circuits 78a-78c is coupled to all of the memory access circuits 76a-76c. The director interface circuits 78a-78c handle contention among the directors for access to the memory by cueing memory requests in a conventional manner. Thus, implementation of the subsections 74a-74c, the memory access circuits 76a-76c, and the director interface circuits 78a-78c as described herein are all fairly straight-forward to one of ordinary skill in the art.

Figure 5:
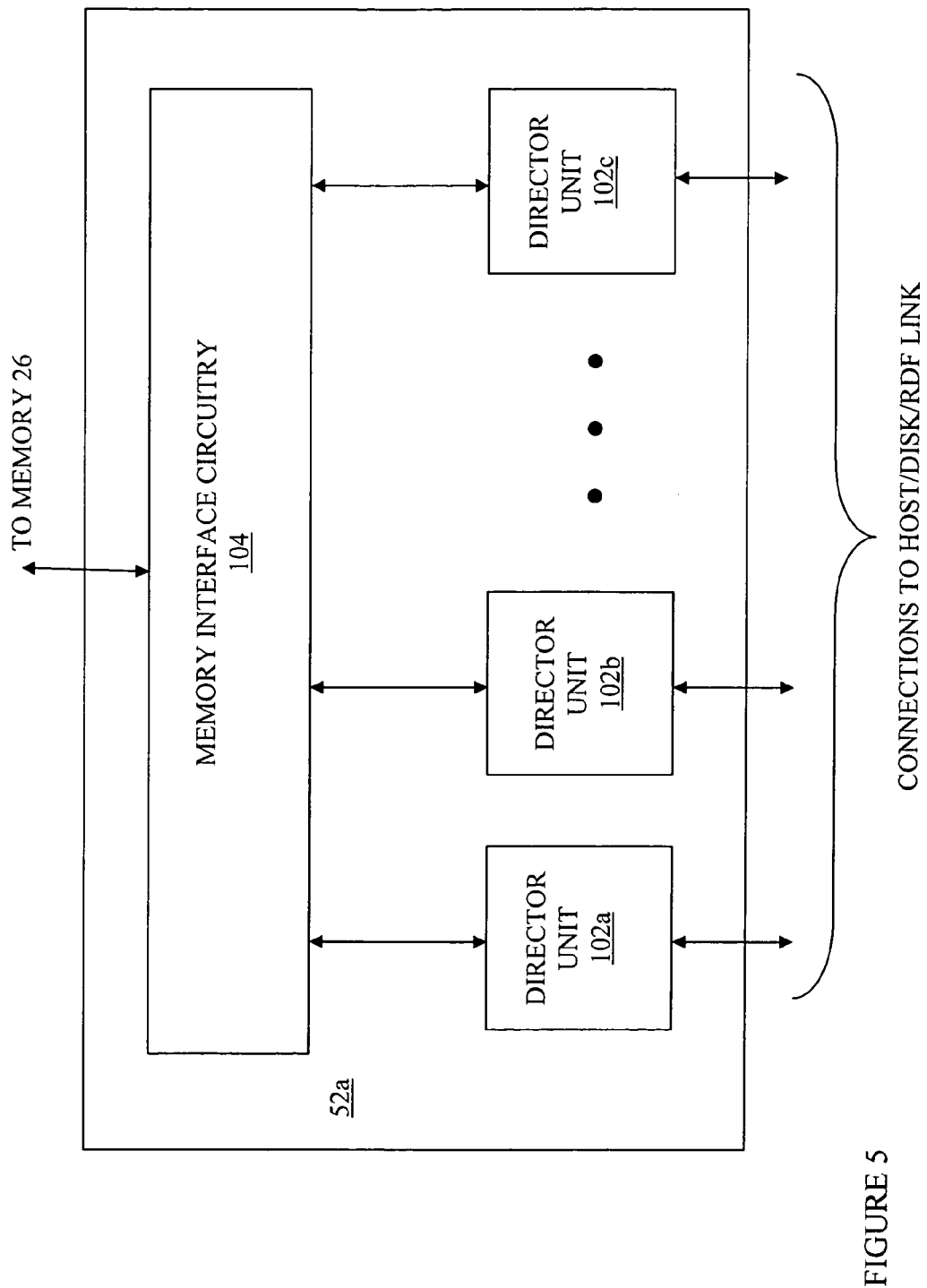
FIG. 5 is a schematic diagram showing a director according to the system described herein.

Referring to FIG. 5, the director 52a is shown in more detail as including a plurality of director units 102a-102c and memory interface circuitry 104. In an embodiment disclosed herein, there are a maximum four of the director units 102a-102c on any director. However, other embodiments could include a different number and/or different maximum number of the director units 102a-102c for the director 52a. For example, it may possible to have a single one of the director units 102a-102c on each director.

The memory interface circuitry 104 includes circuitry for interfacing with the memory boards 62a-62c. In some embodiments, the memory interface circuitry 104 includes buffers while in other embodiments the memory interface circuitry 104 does not include buffers. The memory interface circuitry 104 includes appropriate hardware for handling addressing of the memory board 62a-62c and for handling simultaneous request for memory access by more than one of the director units 102a-102c. Implementing such functionality in the memory interface circuitry 104 is straight forward to one of ordinary skill in the art.

Referring to FIG. 6, the memory interface circuitry 104 is shown in more detail as including a first memory interface circuitry unit 106a and a second memory interface circuitry unit 106b. In an embodiment herein, each of the units 106a, 106b is coupled to all of the director units 102a-102c. However, the unit 106a is coupled to only half of the memory boards 62a-62c while the unit 106b is coupled to the other half of the memory boards 62a-62c. As described in more detail elsewhere herein, the ones of the memory boards 62a-62c addressed by the memory interface circuitry unit 106a are mirrors to the ones of the memory board 106a-106c addressed by the memory interface circuitry unit 106b. That is, for each address range in a first one of the memory boards 62a-62c there is a mirrored address range in a second one of the memory boards 62a-62c where the first one of the memory boards 62a-62c is coupled to the memory interface circuitry unit 106a while the second one of the memory boards 62a-62c is coupled to the memory interface circuitry unit 106b. In an embodiment herein, software running on the director units 102a-102c provides an address that corresponds to both mirrors.

Referring to FIG. 7, the director unit 102a is shown in more detail as including a CPU Core 112 and a local memory 114. The CPU Core 112 performs the functions of the director which depend on whether the director is an HA, DA, RA, or perhaps some other type of director. The local memory 114 is used by the CPU Core 112.

The director unit 102a also includes an external interface 116 that interfaces with the communications module 54 (discussed elsewhere herein) and with whatever hardware is coupled to the director unit 102a. For example, if the director unit 102a is an HA, then the external interface 116 is coupled to a host. On the other hand, if the director unit 102a is a DA, then the external interface 116 is coupled to a disk. Similarly, if the director unit 102a is an RA, then the external interface 116 is coupled to an RDF link to a remote storage device.

The director unit 102a also includes a pipe machine 118 that handles data transfers between the memory 26 (via the memory interface circuitry 104), the local memory 114, and whatever coupled to the director unit 102a through the external interface 116 (e.g., a host, a disk, or an RDF link). The functionality provided by the pipe machine 118 is discussed in more detail elsewhere herein. Note that the CPU Core 112 may include one or more CPU's that share all functionality, share some functionality, or divide functionality therebetween. Similarly, the external interface 116 may include one or more CPU's that handles the operations provided by the external interface 116. Alternatively, the external interface 116 may be implemented using dedicated circuitry and/or a PLA or equivalent that provides the functionality described herein.

Figure 8:
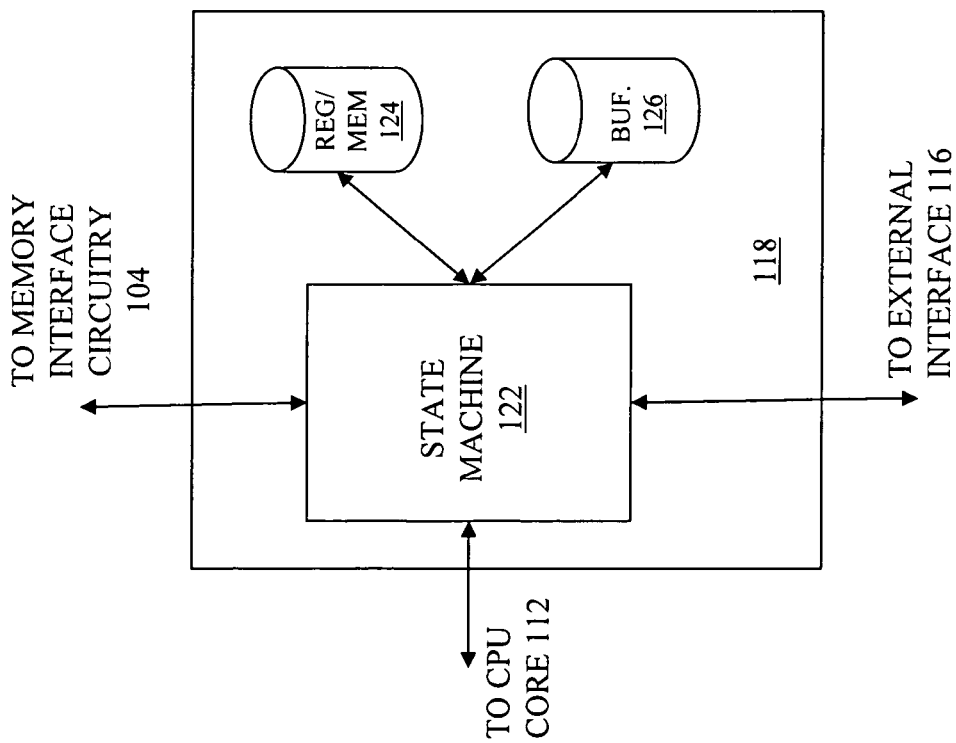
FIG. 8 is a schematic diagram showing a pipe machine according to the system described herein.

Referring to FIG. 8, the pipe machine 118 is shown as including a state machine 122, internal memory/registers 124 and, optionally, a buffer 126. The state machine 122 may be implemented using a PLA or equivalent that provides the functionality described herein. The memory/registers 124 are provided by internal memory that supports the state machine 122 to provide the functionality described herein. The optional internal buffer 126 may be used to temporarily store data being transferred by the pipe machine 118. It will be appreciated by one of ordinary skill in the art that the pipe machine 118 may be provided using conventional, off the shelf, DMA chips, chips sets, circuitry, or the equivalent that has been configured to provide the functionality described herein. The memory/registers 124 and/or the internal buffer 126 may be provided by conventional memory. The state machine 122 may be provided using a PLA, a chip set, or the equivalent configured to provide the functionality described herein.

Some of the operations performed by the pipe machine 118 include transferring data between the memory 26 and the device (e.g., a host, or a disk drive) coupled to the director board 102a through the external interface 116. For those operations, the pipe machine 118 is provided with a starting address in the memory 26 and an indicator of the amount of data to be transferred. As discussed elsewhere herein, the addresses used herein to access the memory may correspond to both mirrors in a mirrored pair. The pipe machine 118 then performs a transfer to transfer the data from the memory 26 to the external interface 116. The data may be read (transferred) from the external interface 116 by, for example, a host or a disk drive coupled thereto. In the case of writing data from the external interface 116 to the memory 26, the pipe machine 118 transfers to the memory 26 (using, for example, a DMA-type transfer) data that is externally provided (written) to the external interface 116 by, for example, a host or a disk drive.

The pipe machine 118 may also be used to transfer data from one location in the memory 26 to another location in the memory 26 by providing the pipe machine 118 with both of the addresses in the memory 26 and an indicator of the amount of data to be transferred.

The pipe machine 118 may also transfer data between the memory 26 to the local memory 114 used by the director unit 102a. Such a transfer is similar to the transfer between the memory 26 and the external interface 116. The pipe machine 118 may be provided with a starting address in the memory 26, an address in the local memory 114, and an indicator of the amount of data to be transferred. The data may be transferred in either direction.

In an embodiment herein, redundancy is provided by having each of the memory boards 62a-62c coupled to one of the memory interface circuitry units 106a, 106b be a mirror for a corresponding one of the memory boards 62a-62c coupled to the other one of the memory interface circuitry units 106a, 106b. Thus, for example, data written to one of the memory boards 62a-62c coupled to the memory interface circuitry unit 106a is also written to another one of the memory boards 62a-62c coupled to the memory interface circuitry unit 106b. This redundancy provides that if one of the memory interface circuitry units 106a, 106b were to fail, the complete memory contents would be accessible through the other, non-failing, one of the memory interface circuitry units 106a, 106b. In addition, if one of the memory boards 62a-62c were to fail or to partially fail, no data would be lost because the data would have been mirrored on another one of the memory board 62a-62c. In addition, as described in more detail elsewhere herein, the system may allow for replacement of failed memory boards without interrupting operation and/or the addition of new memory boards without interrupting operation.

In an embodiment herein, mirroring of the contents of the memory board 62a-62c is provided automatically either by the hardware (e.g., the pipe machine 118), the software that interfaces with the pipe machine 118 (described in more detail elsewhere herein), or some combination thereof. Thus, in an embodiment herein, a write operation to the memory 26 will automatically cause the data be written to two separate locations, a primary location couple to one of the memory interface circuitry boards 106a and a secondary location coupled to the other one of the memory interface circuitry boards 106a, 106b, so that the written data is automatically mirrored on two different ones of the memory board 62a-62c. Failure of one of the boards 62a-62c or one of the memory interface circuitry units 106a, 106b will not cause loss of the data.

In an embodiment herein, an interface to the pipe machine 118 is provided by software that controls access thereto. The software runs on one or more of the processor used by the director unit 102a-102c so that each of the director units 102a-102c has at least one processor running software for interfacing to the pipe machine 118. In an embodiment herein, one processor of each of the director units 102a-102c is used to interface with the pipe machine 118. However, it is possible to have multiple processors of a single one of the director units 102a-102c interface with the pipe machine 118. In an embodiment herein, the pipe machine 118 and the software for interfacing to the pipe machine 118 provides the only interface for memory accesses by software running on each of the director units 102a-102c.

The software that interfaces with the pipe machine is called with parameters that include an address in the memory 26 and/or the local memory 114 and the type of operation to be performed (read, write, or read/modify/write, described elsewhere herein). The software may also pass additional parameters. In an embodiment herein, addressing of the memory 26 is provided using a sixty-four bit address where forty of the least significant bits address memory within each of the memory board 62a-62c. The remaining address bits are used to select which of the memory board 62a-62c is being addressed and/or to provide additional parameters (e.g., a specific one of the mirrors), as discussed elsewhere herein. Addressing of the local memory 114 is linear. Thus, a single address may correspond to both mirrors in a mirrored memory pair.

In some embodiments, the pipe machine 118 and/or the software that interfaces with the pipe machine 118 automatically handles writing data to a mirror when data is written to either pair of a mirror and the memory is in dual write mode. As described elsewhere herein, portions of the memory 26 may be in single write mode instead of dual write mode, in which case the pipe machine 118 and/or the software that interfaces with the pipe machine 118 will not automatically write data to a mirror when data is written to either pair of a mirror.

Figure 9:
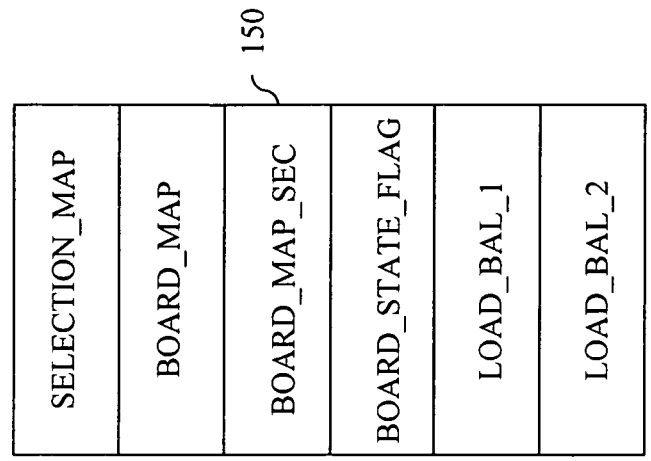
FIG. 9 is a table showing data used by software that interfaces with a pipe machine according to the system described herein.

Referring to FIG. 9, a table 150 includes parameters that are used by software that interfaces with the pipe machine 118. The table 150 includes a selection_map entry which is initialized upon power up and is only subsequently modified upon memory failure, replacement of memory, or addition of memory, as described in more detail elsewhere herein. The selection_map entry may indicates which memory of a mirrored pair is primary memory, which memory of a mirrored pair is secondary memory, whether memory is in dual write mode or single write mode, and which memory has failed or is in the process of being recovered. The selection_map entry may also indicate if memory is in copy mode during a copy back procedure (discussed elsewhere herein). In an embodiment herein, the selection_map entry represents the entire memory 26 in ¼ gigabyte increments. Of course, other memory increments may be provided, as appropriate. In an embodiment herein, memory is by default configured to be in dual write mode and is striped to that every other entry in the selection_map indicates that the portion is either primary or secondary memory. Note, however, that other configurations are possible and that is possible to initially configure some or all of the memory in single write mode.

The board_map entry of the table 150 identifies the primary memory board (i.e., one of the memory boards 62a-62c) for every section of memory 26. Similarly, the board_map_sec entry identifies the secondary memory board for each section of memory. In an embodiment herein, the increments used by the board_map and the board_map_sec are the same as the increments used in the selection_map entry. In addition, the selection_map, the board_map, and the board_map_sec may all be modified at the same time.

The table 150 also includes a board_state_flag which indicates the state of each of the memory board 62a-62c. In an embodiment herein, each of the memory boards 62a-62c may be identified as failed, suspected, good, new, in test, in copy, vacated, ready, and not configured. Use and modification of the board_state_flag for each of the memory boards 62a-62, is discussed in more detail elsewhere herein.

The table 150 also includes a load_bal__1 entry and a load_bal__2 entry, which are used for read load balancing.

The memory size increments for the load_bal_1 and load_bal_2 entries may be similar to the increments used for the selection_map (i.e., ¼ gigabyte). Use of the load_bal_1 and load_bal_2 entries is discussed in more detail elsewhere herein.

In an embodiment herein, writes are automatically written to both the primary and secondary memory locations while reads are read from one of the locations, depending on operation of the load balancing algorithm. However, as discussed in more detail elsewhere herein, for a mirrored pair in dual write mode it is possible to pass a parameter to the software that interfaces with the pipe machine 118 to indicate, in the case of write, that the write is to occur to only one of the mirrors or, in the case of a read, that the read is to be to only a specific one of the pair. Such options are useful, for example, in connection with restoring a failed memory board, where a read is performed to the non-restored board and the data is copied to the board being restored. Thus, in such a case, it is useful that the read be performed to a specific one of the memory pair and that the write be performed to a specific other one of the mirror pair. Restoring a failed memory board is discussed in more detail elsewhere herein.

Figure 10:
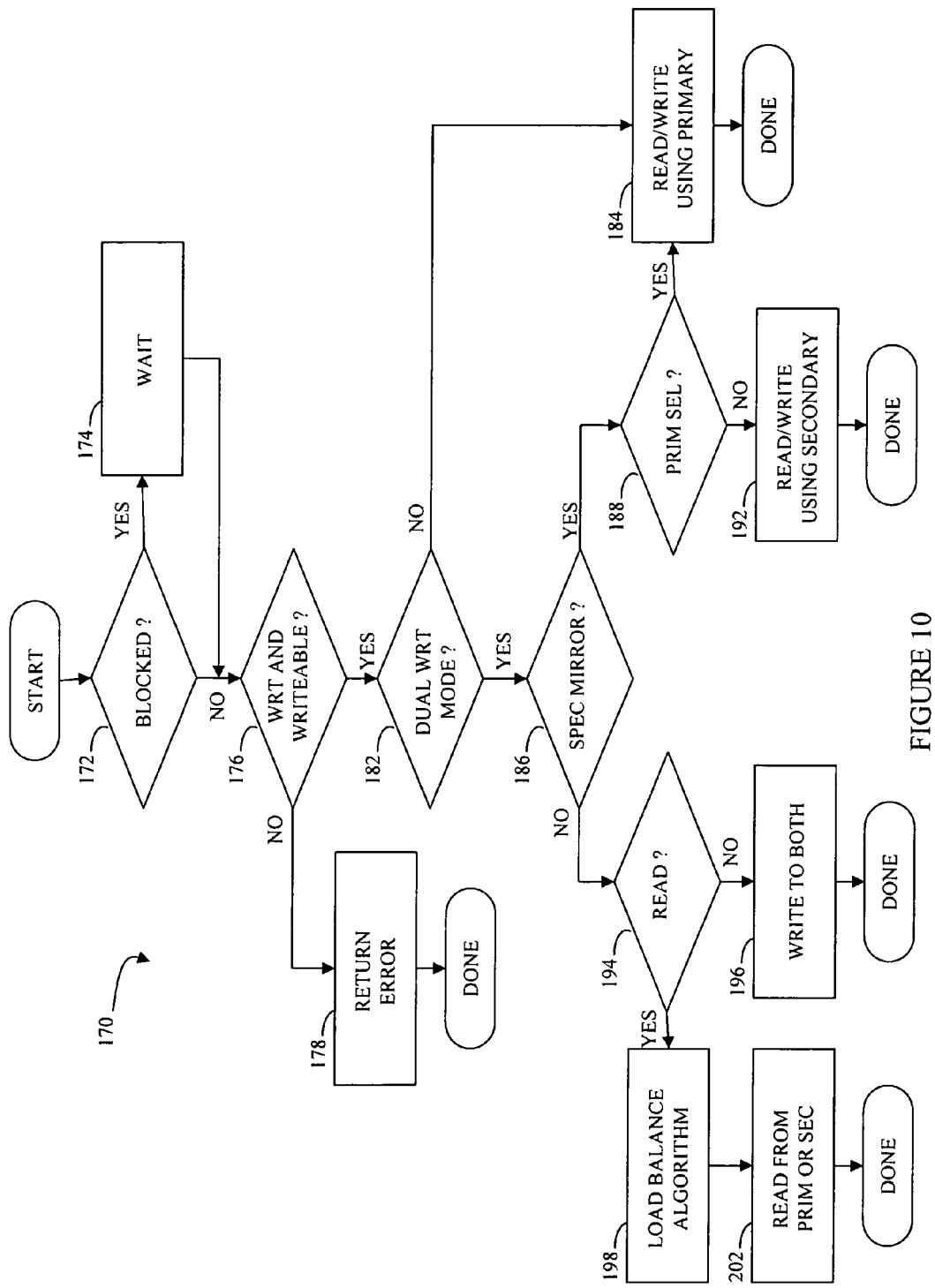
FIG. 10 is a flowchart showing steps performed in connection with reading and writing data using a pipe machine according to the system described herein.

Referring to FIG. 10, a flow chart 170 shows steps performed by software used to provide access to the memory 26 through the pipe machine 118. Processing begins with a first test step 172 which determines if the particular memory being accessed is blocked. Access to memory may be blocked for any number of reasons, including entry of a Failover State (described below) while the selection_map entry is being modified. In an embodiment herein, access to memory is blocked only in connection with entry of the Failover State. In some instances and some embodiments, all tasks except a memory error detection task are blocked.

If it is determined that the test step 172 that the memory access is blocked, then control transfers from the step 172 to a step 174 where the process waits for the memory to become unblocked. Following step 174 or following step 172 if the memory access is not blocked, is a test step 176 which determines if a write operation is being performed and, if so, if the memory portion being written to is writeable. In some instances, portions of the memory 26 may not be writeable or may only be writeable by certain ones of the director units 102a-102c. Information about which portions of the memory 26 are writeable by which of the director units 102a-102c may be provided in a table (not shown) that is configured during power up and/or that may be modified dynamically by processes that access the memory 26.

If it is determined at the step 176 that an attempt is being made to write to a portion of memory that is not writeable, then control transfers from the step 176 to a step 178 where an error is returned to the calling process after which processing is complete. Otherwise, control transfers from the step 176 to a test step 182 which determines if the memory being accessed is in dual write mode (as indicated by the selection_map entry of the table 150). As discussed elsewhere herein, in most instances most portions of the memory 26 will be in dual write mode so that a write to one of the memory boards 62a-62c will cause an automatic write to another one of the memory boards 62a-62c. However, in some cases (discussed elsewhere herein), a particular memory address or range of addresses may not be in dual write mode. Accordingly, if it is determined at the test step 182 that the memory being accessed is not in dual write mode, then control transfers from the step 182 to a step 184 where the read or write operation is performed using the primary memory. Note that when a portion of the memory is in single write mode, that portion will be the primary memory and there will not be a secondary memory. Following step 184, processing is complete.

If it is determined at the test step 182 that the memory being accessed is in dual write mode, then control transfers from the step 182 to a test step 186, which determines if the operation is directed to a specific one of a mirrored memory pair. As discussed elsewhere herein, it is possible to direct a read or write operation to either the primary or the secondary memory of a mirrored pair. If a parameter has been passed to the software that interfaces with the pipe machine 118 to indicate that the read or write operation is to be performed to a specific one of a mirrored pair, then control transfer from the step 186 to a test step 188 which determines if the primary memory has been selected for the operation. If so, then control transfers from the step 188 to the step 184 where the read or write operation is performed using the primary memory. Following step 184, processing is complete. On the other hand, if it is determined at the test step 188 that the primary memory has not been selected for the specific operation, then control transfers from the step 188 to a step 192 where the read or write operation is performed using the secondary memory of a mirrored pair. Following step 192 processing is complete. It is possible to determine the primary and secondary memory using the table 150.

If it is determined at the test step 186 that the operation has not targeted a specific one of a primary or secondary memory pair, then control transfers from the test step 186 to a test step 194 which determines if a read operation is being performed. If not, then control transfers from the step 194 to a step 196 where the write is performed to both the primary memory and the secondary memory. In some embodiment, the write is performed automatically to both memories at the step 196 by appropriately configuring the pipe machine 118 to automatically write to both the primary and the secondary memory upon receipt of a single write operation. In other embodiments, the write may be performed to both memories by sending two sets of commands to the pipe machine 118: a first set of commands to write to the primary memory and a second set of commands to write to the secondary memory. Following step 196, processing is complete.

If it is determined at the test step 194 that a read operation is being performed, then control transfers from the step 194 to a step 198 where a load balancing algorithm is performed. The load balancing algorithm performed at the step 198 determines whether to read the data from the primary memory or from the secondary memory and is discussed in more detail elsewhere herein. Following step 198 is a step 202 where a read is performed using the primary memory or the secondary as indicated by the load balancing algorithm performed at the step 198. Following step 202, processing is complete.

The flow chart 170 of FIG. 10 may be used in connection with a read/modify/write operation, which provides for reading data from memory, modifying the data, and then writing the modified data back to the memory. A read/modify/write operation is useful, for example, in connection with setting or toggling a particular bit in a range of data. In some embodiments, the pipe machine 118 will be capable of accepting and performing read/modify/write operations to both mirrors in parallel, in which case the software that interfaces with the pipe machine 118 will follow the same flow path as that described for a write operation. In other embodiments, the pipe machine 118 itself will not perform a read/modify/write operation to both mirrors in parallel, in which case the software that interfaces with the pipe machine 118 will perform the read/modify/write operation twice, serially, first to the primary mirror and then to the secondary mirror.

Figure 11:
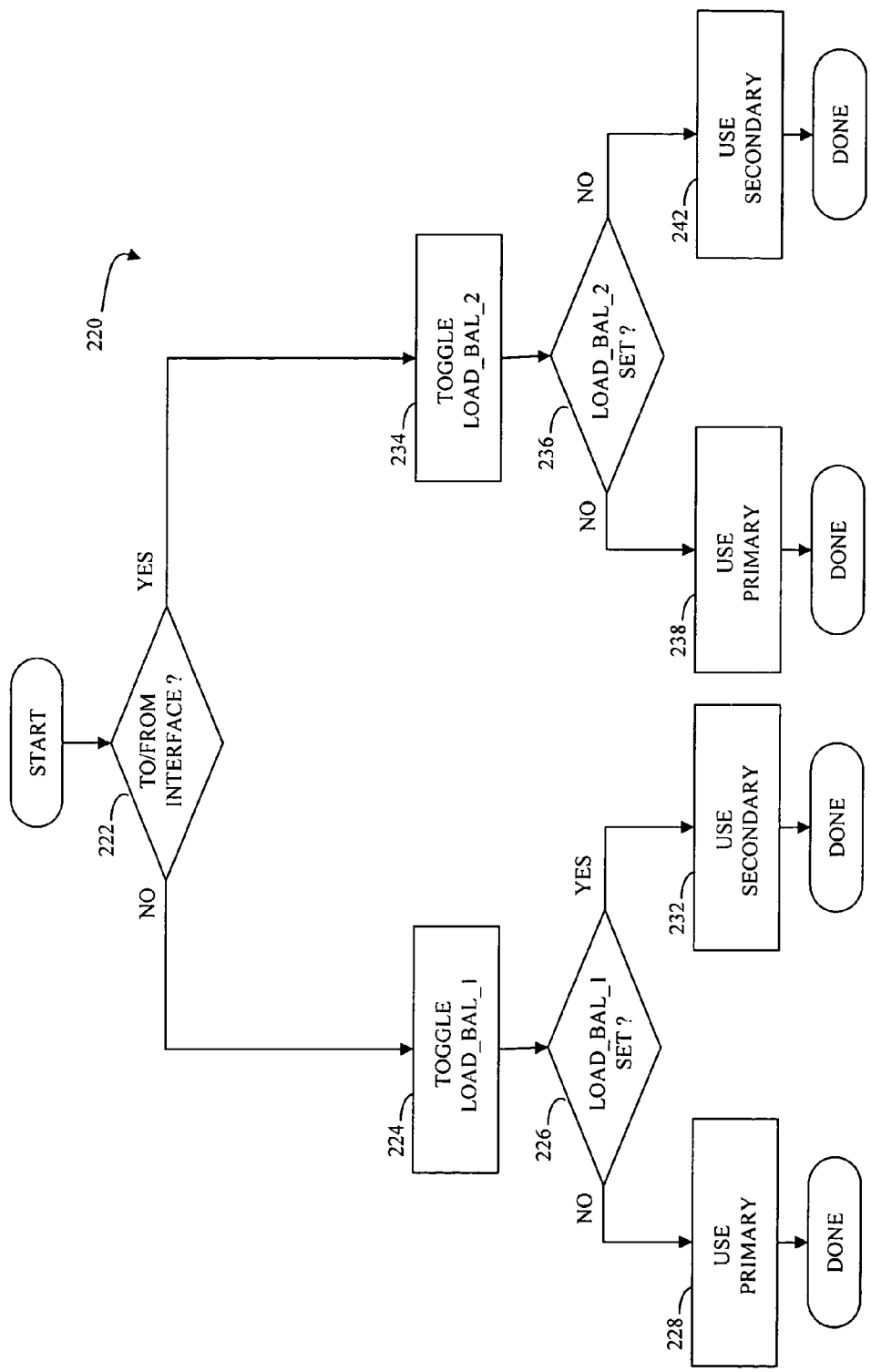
FIG. 11 is a flowchart illustrating a load balancing algorithm used in connection with the system described herein.

It is possible to use any one of a number of load balancing algorithms at the step 198 to balance read operations to both the primary and secondary memories in a way that attempts to minimize collisions. Referring to FIG. 11, a flow chart 220 illustrates steps performed by a load balancing algorithm used in embodiments herein at the step 198. Processing begins at a first step 222 where it is determined if the operation transfers data to or from the interface circuitry 116 of the director unit. If not, then control transfers from the step 222 to a step 224 where the load_bal_1 entry corresponding to the portion of the memory 26 being accessed is toggled. In an embodiment herein, load_bal_1 and load_bal_2 are variables (flags or Boolean values) that can be set or cleared (set to true or false) and toggling involves transitioning from one state to the other.

Following step 224 is a test step 226 where it is determined if the load_bal_1 entry is set. If not, then control transfers from the step 226 to a step 228 where the load balancing algorithm determines that the primary memory will be used for the read. Otherwise, if it is determined at the step 226 that the load_bal_1 entry for the table is set, then control transfers from the step 226 to a step 232 where load balancing algorithm determines that the secondary memory will be used for the read operation. Following either the step 228 or the step 232, processing is complete.

If it is determined at the step 222 that the data is being transferred to or from the interface circuitry 116 of the director unit, then control transfers from the test step 222 to a step 234 where the load_bal_2 entry corresponding to the portion of the memory 26 being accessed is toggled. Following step 234 is a test step 236 where it is determined if the load_bal_2 entry is set. If not, then control transfers from the step 236 to a step 238 where the load balancing algorithm determines that the primary memory will be used for the read. Otherwise, if it is determined at the step 236 that the load_bal_2 entry for the table is set, then control transfers from the step 236 to a step 242 where load balancing algorithm determines that the secondary memory will be used for the read operation. Following either the step 238 or the step 242, processing is complete.

Referring to FIG. 12, a state diagram 260 illustrates states for each of the memory boards 62a-62c. As discussed above, the state information may be provided in the board_state_flag entry of the table 150 for each of the director units. Each of the director units may modify its local copy of the table 150 as appropriate in accordance with the description herein. The different states as well as the transitions between the states and the operations performed at each of the states is discussed in more detail in connection with the state diagram 260.

Following a power up is entry into an initialization and configuration state 262. While in this state, a memory board may be tested (using any appropriate test or tests) to confirm that it is operational. During initialization, the board_state_flag for the memory board may be first set to "in test" followed by "ready". Once the initialization is complete, transition occurs from the initialization and configuration state 262 to a normal state 264 where the memory is in dual write mode (if the system is so configured). Note that the initialization and configuration state 262 may only be entered upon power up.

In some cases, an error may occur in connection with a read or write to one of the memory boards 62a-62c. In an embodiment described herein, the hardware may be configured so that a failed memory interrupt is generated in connection with a failed memory access. The failed memory interrupt is received by all of the directors 52a-52c or corresponding director units thereof. Part of the failed memory interrupt routine may be for each of the director units to set the state of the board_state_flag for the memory board to "suspect" on their version of the table 150.

In response to a failed memory interrupt, the board transitions from the normal state 264 to a detection state 266 where the failed memory interrupt is investigated by, for example, running tests to determine if the memory board is in fact failed. The tests may be the same as the tests run in the initialization and configuration state 262 or may be different tests, as appropriate. In an embodiment herein, all of the directors 52a-52c receive the failed memory interrupt and one of the directors that is a DA manages the tests by placing tasks in a queue in the memory 26 for other DA director units to execute. A global table is also placed in the memory 26 for all the director units to monitor and modify as the tests are conducted. If the tests indicate that the memory board (and/or memory board interface) has not failed, then the memory board transitions back to the normal state 264 and the table 150 for each of the director units is modified accordingly.

If the tests run at the state 266 indicate that the memory (and/or memory interface) has failed, then the board transitions from the detection state 266 to a failover state 268. At the failover state 268, the board_state_flag entries in the table 150 for each of the director units is changed to "failed". In addition, each of the director units modifies their copy of the table 150 so that the selection_map, board_map, and board_map_sec entries cause the other one of the mirrored pair to be in single write mode and to be the primary memory (if it is not already). Once the failover operations are complete, the system transitions from the failover state 268 to a degraded memory state 272.

In the degraded memory state 272, the system waits for the failed memory board to be removed and a new memory board to be inserted in place of the failed memory board. In an embodiment herein, the system may detect a new memory board by first detecting that the memory slot is empty (i.e., the board_state_flag indicates "vacated") and then detecting that a new memory board has been inserted (i.e., the board_state_flag is "new"). If a new memory board insertion is detected while the system is in the degraded memory state 272, the system transitions into a failback and sync state 274. In the failback and sync state 274, the new memory board is tested and then data is copied from the corresponding primary memory to the new memory board.

In an embodiment herein, the testing the new memory board may be performed by a subset of the director units while the copying may be performed by more or even all of the director units. One of the directors that is a DA manages the process by placing tasks in a task queue in memory 26 for other DA director units to execute to perform the tests of the new memory board. A global table is placed in the memory 26 for all the director units to monitor and modify as the tests are conducted.

If the tests indicate that the new memory board is OK, then the DA that manages the process places additional tasks in a task queue for all of the directors to execute to copy data from the primary memory to the new memory board. During this process, the selection_map entry of the table 150 for the corresponding primary memory for each of the director units corresponding to the board is set to in_copy, which may be used in connection with writing data to the primary memory during the copy process. While a primary memory is set to in_copy in the selection_map, writes to the primary memory are synchronized so that written data is appropriately transferred to the new memory. In an embodiment herein, writes to a primary memory that is being copied to a new memory are performed by locking appropriate sections of both the primary memory and the new memory (using software or hardware locks), performing the write to both memories, and then unlocking both memories. The locks prevent other accesses to the memories. In some instances (e.g., if a write is being performed to a portion of the primary memory that has already been copied), then the write may simply be provided to both the primary memory and the new memory using the same or a similar mechanism as that described in connection with the flow chart 170 of FIG. 10.

If the memory testing, copying, etc. fails in any way while the new memory board is in the failback and sync state 274, the new memory board transitions back to the degraded memory state 272 to wait for another new memory board to be inserted. Alternatively, if the system is in the failback and sync state 274 and the memory testing and copying is complete, then the new memory board transitions from the failback and sync state 274 back to the normal state 264 to resume normal operation. In the normal state, the board_state_flag may be set to "ready". In addition, each of the director units appropriately modifies their copy of the table 150 for the selection_map, board_map, and board_map_sec to have the new memory board and the corresponding mirror operate in dual write mode.

Note that different memory boards may be in different states depending on the operation of each of the memory boards so that, for example, one of the memory boards 62*a*-62*c* may be in the normal state 264 while another one of the memory boards 62*a*-62*c* is in a different state such as the degraded memory state 272. Note also that, while memory copying is performed, access to the memory may be held up so that, for example, a process trying to read or write to the memory will need to wait for the memory to be unblocked. This is discussed above in connection with the steps 172, 174 of the flow chart 170 of FIG. 10.

It is possible to use the state diagram 260 to describe a process used when memory boards are added for the first time to the system. If a memory board is added, the corresponding board_state_flag transitions from "not configured" to "new". In such a case, the memory board may be placed in the failback and sync state 274 and processing may proceed as described above. Of course, if memory is being added in pairs (i.e., both primary and secondary memory boards at the same time), then it will not be necessary to copy data between the two new boards. Alternatively, if new memory is being added to provide a secondary memory for already existing primary memory, then the procedure is similar to that described above for replacing failed memory.

While the invention has been disclosed in connection with various embodiments, modifications thereon will be readily apparent to those skilled in the art. Accordingly, the spirit and scope of the invention is set forth in the following claims.

What is claimed is:

1. A method of handling a faulting memory of a pair of mirrored memories, comprising:
    initially causing a non-faulting memory of the pair of mirrored memories to service all read and write operations for the pair of mirrored memories;
    determining that hardware corresponding to the faulting memory of the pair of mirrored memories has been successfully replaced to provide a new memory, wherein the new memory and the non-faulting memory form a new pair of mirrored memories;
    in response to the new memory being provided, causing stored data to be copied from the non-faulting memory to the new memory while data is being read from and new data written to the non-faulting memory;
    in response to a write of the new data being performed to the non-faulting memory at a time while the stored data is being copied from the non-faulting memory to the new memory, causing the write to be performed to the non-faulting memory and the new memory as part of a mirroring operation between the new memory and the non-faulting memory of the new pair of mirrored memories that occurs during at least a portion of the time while the stored data is being copied from the non-faulting memory to the new memory; and
    in response to successful copying to the new memory, causing writes to be performed to both memories of the new pair of mirrored memories and selecting one of the new pair of mirrored memories for read operations when one or more read operations are performed.

2. A method, according to claim 1, further comprising:
    in response to a write being performed to the non-faulting memory while data is being copied from the non-faulting memory to the new memory, causing a corresponding portion of the non-faulting memory and the new memory to be locked to prevent additional access thereto.

3. A method, according to claim 1, wherein determining that hardware corresponding to the faulting memory of the pair of mirrored memories has been successfully replaced includes testing the memory hardware prior to causing data to be copied from the non-faulting memory to the new memory.

4. A method, according to claim 3, further comprising:
    in response to testing the memory hardware indicating a failure, determining that the hardware has not been successfully replaced.

5. A method, according to claim 3, wherein testing the memory hardware includes having each of a plurality of processors perform tests on a section of the memory hardware.

6. A method, according to claim 5, wherein each of the plurality of processors determines which section of data to test based on information provided to all the processors in a global memory.

7. A method, according to claim 1, wherein causing data to be copied includes having each of a plurality of processors copy a section of the data.

8. A method, according to claim 7, wherein each of the plurality of processors determines which section of data to copy based on information provided to all the processors in a global memory.

9. Computer software, provided in a computer-readable medium, that handles a faulting memory of a pair of mirrored memories, comprising:
    executable code that initially causes a non-faulting memory of the pair of mirrored memories to service all read and write operations for the pair of mirrored memories;
    executable code that determines that hardware corresponding to the faulting memory of the pair of mirrored memories has been successfully replaced to provide a new memory, wherein the new memory and the non-faulting memory form a new pair of mirrored memories;

executable code that causes stored data to be copied from the non-faulting memory to the new memory while data is being read from and new data written to the non-faulting memory after the new memory is provided;

executable code that, in response a write of the new data being performed to the non-faulting memory at a time while the stored data is being copied from the non-faulting memory to the new memory, causes the write to be performed to the non-faulting memory and the new memory as part of a mirroring operation between the new memory and the non-faulting memory of the new pair of mirrored memories that occurs during at least a portion of the time while the stored data is being copied from the non-faulting memory to the new memory; and executable code that causes writes to be performed to both memories of the new pair of mirrored memories and selects one of the new pair of mirrored memories for read operations when one or more read operations are performed in response to successful copying to the new memory.

10. Computer software, according to claim 9, further comprising:

executable code that causes a corresponding portion of the non-faulting memory and the new memory to be locked to prevent additional access thereto in response to a write being performed to the non-faulting memory while data is being copied from the non-faulting memory to the new memory.

11. Computer software, according to claim 9, wherein executable code that determines that hardware corresponding to the faulting memory of the pair of mirrored memories has been successfully replaced includes executable code that tests the memory hardware prior to causing data to be copied from the non-faulting memory to the new memory.

12. Computer software, according to claim 11, further comprising:

executable code that determines that the hardware has not been successfully replaced in response to testing the memory hardware indicating a failure.

13. A data storage device, comprising:
a plurality of disk drives;
an internal volatile memory; and
a plurality of directors coupled to the memory, wherein some of the directors are coupled to the disk drives and some of the directors allow external access to the data storage device and wherein each of the directors handles a faulting memory of a pair of mirrored memories by initially causing a non-faulting memory of the pair of mirrored memories to service all read and write operations for the pair of mirrored memories, determining that hardware corresponding to the faulting memory of the pair of mirrored memories has been successfully replaced to provide a new memory, wherein the new memory and the non-faulting memory form a new pair of mirrored memories, in response to the new memory being provided, causing stored data to be copied from the non-faulting memory to the new memory while data is being read from and new data written to the non-faulting memory, in response to a write of the new data being performed to the non-faulting memory at a time while the stored data is being copied from the non-faulting memory to the new memory, causing the write to be performed to the non-faulting memory and the new memory as part of a mirroring operation between the new memory and the non-faulting memory of the new pair of mirrored memories that occurs during at least a portion of the time while the stored data is being copied from the non-faulting memory to the new memory, and, in response to successful copying to the new memory, causing writes to be performed to both memories of the new pair of mirrored memories and selecting one of the new pair of mirrored memories for read operations when one or more read operations are performed.

14. A data storage device, according to claim 13, wherein each of the directors, in response to a write being performed to the non-faulting memory while data is being copied from the non-faulting memory to the new memory, causes a corresponding portion of the non-faulting memory and the new memory to be locked to prevent additional access thereto.

15. A data storage device, according to claim 13, wherein determining that hardware corresponding to the faulting memory of the pair of mirrored memories has been successfully replaced includes testing the memory hardware prior to causing data to be copied from the non-faulting memory to the new memory.

16. A data storage device, according to claim 15, wherein, in response to testing the memory hardware indicating a failure, at least one of the directors determines that the hardware has not been successfully replaced.

17. A data storage device, according to claim 15, wherein testing the memory hardware includes having at least some of the directors perform tests on a section of the memory hardware.

* * * * *